Sept. 11, 1962 J. F. CLAPP, JR 3,053,274
VALVE CONSTRUCTION
Filed March 24, 1961

INVENTOR.
JOHN F. CLAPP, JR.
BY
ATTORNEYS 3,053,274
VALVE CONSTRUCTION
John F. Clapp, Jr., Danielson, Conn., assignor to The American Thermos Products Company, a corporation of Michigan
Filed Mar. 24, 1961, Ser. No. 98,169
5 Claims. (Cl. 137—512)

This invention relates generally to fluid valves and more particularly to a three-way double check valve of improved construction.

Much is known concerning the operation and construction of check valves. Valves of this type have many useful applications for automatically and selectively shunting and directing the flow of fluids through different tubes, pipes, etc. It is conventional to construct such valves of cast or machined parts, having internal close-tolerance machined valve seats. The latter cooperate with members automatically movable in response to fluid flow to selectively provide sealing of one or more valve ports. In some instances, the movable valve members may be spring-loaded for return to a neutral or open position upon the equalization of fluid pressures acting upon them. In these prior valves, economy of manufacture is seriously impaired by the several machining operations which are involved; and the tolerances of a particular valve construction must be rigidly maintained to prevent leakage or other malfunction of the valve.

There is therefore, a great need for simplified check valve construction, which need is greatly satisfied by the novel valve construction of the present invention. In accordance with the invention, a three-way double check valve is herein disclosed, which is entirely constructed of sheet metal parts. Each of these parts may be readily stamped and formed out of sheet metal by the use of relatively inexpensive tooling and the parts thereafter are fitted together by economical sheet metal assembly techniques. The valve has been so designed that internal tolerances are not critical and yet efficient and precise operation is attained. The valve has only two moving parts comprising disc-like valve members. Valve seats as ordinarily recognized in connection with machined valves are eliminated. Consequently, a correlative advantage of the new construction is that repeated cycling of the valve will produce little wear, thus minimizing potential malfunctioning of the valve.

Figure 1:
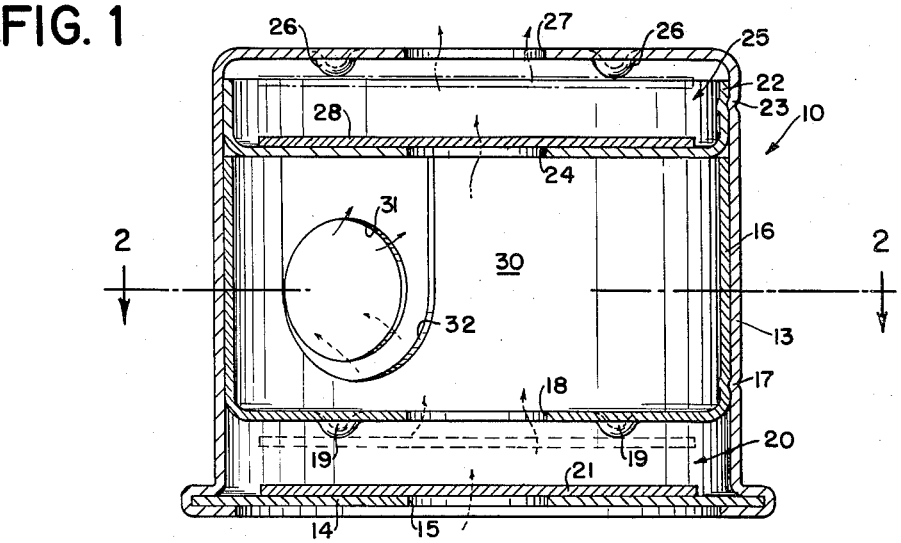
Figure 2:
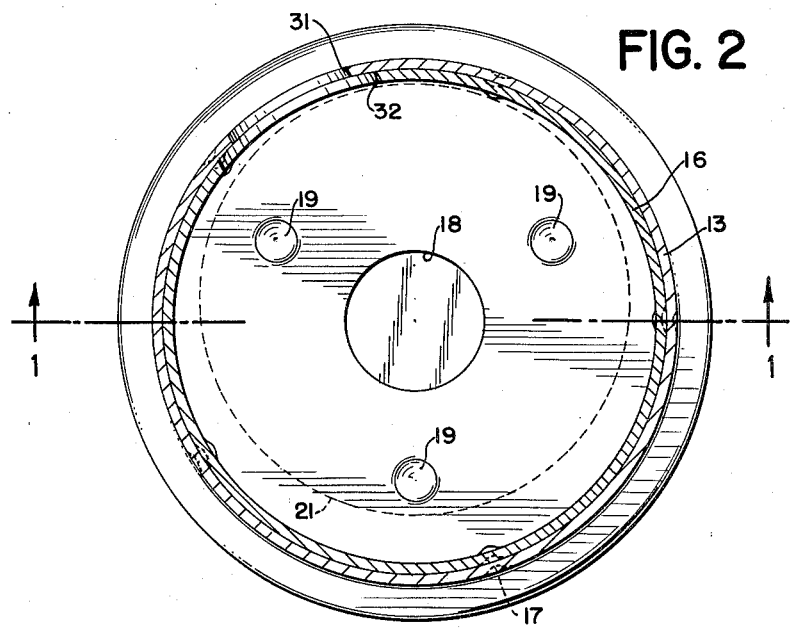

These and other aspects of the invention will become readily apparent after examination of the following description of a particular embodiment and of the accompanying drawing in which:

FIG. 1 is an elevation in cross-section of the valve construction according to the invention; and FIG. 2 is a view taken in the direction of arrows 2—2 of FIG. 1.

Referring now to the drawing, a three-way double check valve 10 has been illustrated which is fabricated entirely of sheet metal parts. The valve comprises a housing having an inverted cup-shaped member 13 defining top and side walls and the cup is crimped into sealing engagement at its lower edge about a plate 14, forming the bottom wall of the housing. The plate 14 defines a centrally located opening 15 which may communicate with an unpressurized source of fluid (not shown) such as a reservoir. A second cup-shaped member 16 is received within the inverted cup 13 and is secured against movement relative thereto by means of stakings 17 formed into the continguous walls of the members 13, 16. The cup 16 will normally be fitted tightly within the outer cup-shaped member 13 so that a seal is created by contact between the walls of the members 13, 16. The cup 16 defines a port 18 and a plurality of integral downward projections or dimples 19 are spaced evenly about the port 18. The two cup-shaped members 13 and 16 together define an inlet chamber 20. A valve disc 21 is located within chamber 20 and is permitted limited freedom of movement in a vertical direction. The width of the disc 21 is somewhat less than the diameter of chamber 20 but sufficiently wide to cover and seal the inlet opening 15 when brought into flat contact against the plate 14.

The opposite end of the valve housing contains a third sheet metal cup 22 which is fitted tightly into sealing engagement within the outer cup 13. The cup 22 is held relative to the cup 13 by stakings 23 in the adjacent walls of the two parts. The cup 22 has been provided with a port 24 and with the cup 13 defines an outlet chamber 25. The cup 13 has been formed with downward projections or dimples 26 which are spaced about an outlet opening 27. Located within the outlet chamber 25 is a second valve disc 28.

An intermediate or main distributing chamber 30 is located within the housing between horizontal wall portions of the respective internally positioned cups 16 and 22. The outer wall of the housing comprising the cup 13, defines a fluid opening 31 adapted for connection to a source of fluctuating pressure (not shown). Such source might comprise, for example, a piston operated pump adapted to draw fluid from the distributing chamber 30 and then to return the fluid under pressure into the chamber 30 for expulsion from the valve. The wall of the inner cup 16 has been cut out in an oversized U-shaped slot 32, provided for ease of assembly of the members 13, 16 with respect to a connection with the source of fluctuating pressure.

Presupposing the valve to be connected at the opening 31 to an alternating suction-pressure source, and at inlet opening 15 to an unpressurized source of fluid, the operation of the valve is as follows:

Reduced fluid pressure or suction from opening 31 will draw fluid out of chamber 30 in the direction of the lower dotted arrows and will draw replacement fluid into the chamber 30 as indicated by the dotted arrows from the lower or inlet chamber 20 througth the lower port 18. The lower valve member or disc 21 will rise against the projections 19 and fluid will be permitted to flow through inlet opening 15 into the inlet chamber 20, around the disc 21 through the port 18 and into the distributing chamber 30. Simulaneously, the upper valve disc 28 will be drawn tightly into sealing engagement over the port 24 in cup 22 thus checking any flow of fluid from the outlet chamber 25.

Upon a reversal of fluid flow, i.e. upon the passage of fluid under pressure into the chamber 30, the lower disc 21 will be forced into sealing contact against the lower plate 14 to close off the inlet opening 15. Pressurized fluid in chamber 30 will then force the upper valve disc 28 to rise to the dotted line position and concurrently fluid will flow from the chamber 30 into the outlet chamber 25, around the disc 28 and out of the outlet opening 27. Upon reversal of pressure within chamber 30, the valve disc 28 will again be drawn downwardly to seal the port 24 while the lower valve disc 21 will again rise to admit fluid into the intermediate chamber 30.

It will be noted that the disclosed valve construction admits of simple individual parts fabrication and of extremely facile assembly. During assembly, the upper of the two internally held cup-shaped members 22 together with the valve disc 28 will first be inserted into the inverted cup 13, followed by insertion of the lower cup 16. Each one of cups 16 and 22 is thus positioned in close adjacent tandem relation. Cups 16 and 22 may then be staked to the outer cup 13 which operation may then be followed by crimping the lower edge of cup 13 to plate 14 with lower valve disc 21 in position, to complete the assembly. If desired, tubing may readily be connected to the valve at each of the external openings 15, 27, and 31 by simply crimping the edge of the tubing into sealing engagement about the periphery of each opening.

The upper and lower valve discs 21 and 28 are the only moving valve parts. These each effect respective sealing of the inlet opening 15 and port 24 by overlying flat contact against the members defining these fluid openings. This minimizes the tendency for valve wear, as does the relatively simple movement of the valve discs themselves between their alternate sealing and non-sealing positions.

It will be understood that the foregoing description relates to a particular embodiment and is therefore merely representative. Changes may be made therefrom without departing from the teachings of the invention. Accordingly, in order fully to appreciate the spirit and scope of the invention, reference should be made to the appended claims in which I claim:

1. A three-way double check valve comprising an outer sheet metal housing forming top, bottom and side walls, defining respectively an outlet opening, an inlet opening and an opening adapted for connection to a source of fluctuating pressure, flat sheet metal means held in sealing engagement against the interior of said housing and extending transversely across the interior thereof to form together with said housing an inlet chamber adjacent said inlet opening an outlet chamber adjacent said outlet opening and a distributing chamber in communication with the opening in said side wall, each of said sheet metal means defining an internal port communicating with said distributing chamber and respectively with said inlet and outlet chambers, inlet valve disc means located in said inlet chamber and movable upon increasing fluid pressure therein into flat contacting sealing relation against the interior of said bottom wall to seal said inlet opening, a first set of a plurality of downward projections carried by said sheet metal means spaced around said port communicating with said inlet chamber as stops against said inlet valve disc upon decreasing pressure of fluid in said inlet chamber and rising movement of said inlet valve disc against said sheet metal means, outlet valve disc means located in said outlet chamber and movable into flat contacting sealing relation against said sheet metal means to seal said port communicating with said outlet and distributing chambers upon decreasing fluid pressure in said distributing chamber, and a second set of a plurality of downward projections carried by the top wall of said housing and spaced about said outlet opening therein as stops against said outlet valve disc upon increasing pressure of fluid in said outlet chamber and rising movement of said disc toward said outlet opening.

2. A valve according to claim 1, in which said housing comprises an inverted cup-shaped member forming top and side walls thereof, a disc-like plate forming the bottom wall of said housing, and the lower edge of said cup-shaped member is crimped about the periphery of said plate in sealing engagement therewith.

3. A valve according to claim 2, in which said projections are formed integrally into said flat sheet metal means, said flat sheet metal means each comprising cup-shaped members having flat bottom walls extending transversely across the interior of said housing and having formed side walls fitted into sealing engagement against the interior of said housing, said formed side walls being staked to said housing to secure said cup-shaped members relative to each other.

4. A check valve for selectively transmitting fluid from a reservoir to an alternating pressure-suction source and for selectively transmitting pressurized fluid from said source comprising an outer cup-shaped sheet metal housing forming top and side walls, a bottom disc crimped to the lower edge of said housing in sealed relation, said disc defining a first inlet opening, a cup-shaped sleeve secured adjacent the inner wall of said housing in sealing relation therewith, said sleeve being open at its upper end and having a bottom wall defining a second inlet opening, a plurality of downward projections formed into the bottom wall of said sleeve spaced about the opening therein, the bottom wall of said sleeve and said bottom disc together with said housing defining an inlet chamber, a valve disc situated within said chamber and substantially co-extensive in width therewith, a second cup-shaped sleeve secured within said housing in sealing relation therewith having an open upper end and a bottom wall defining a first outlet opening, said first and second sleeves defining within said housing a central chamber, an opening in said central chamber, a second outlet opening defined within the upper wall of said housing, a plurality of downward projections formed into the upper wall of said housing and spaced about said second outlet opening, said housing and said second sleeve defining an outlet chamber, a second valve disc in said outlet chamber substantially co-extensive in width therewith, said first and second valve discs being constructed to seal off said first inlet and outlet openings respectively in response to increasing or decreasing pressure within said central chamber.

5. A three-way double check valve comprising an outer housing forming top, bottom and side walls, defining respectively an outlet opening, an inlet opening and an opening adapted for connection to a source of fluctuating pressure, upper and lower partitions held in sealing engagement against the interior of said housing and extending transversely across the interior thereof to form together with said housing an inlet chamber adjacent said inlet opening an outlet chamber adjacent said outlet opening and a distributing chamber in communication with the opening in said side wall, each of said partitions defining an internal port communicating with said distributing chamber and respectively with said inlet and outlet chambers, a flat member comprising inlet valve means located in said inlet chamber and movable upon increasing fluid pressure therein into flat contacting sealing relation against the interior of said bottom wall adjacent to and to seal said inlet opening, a first set of downward projections carried by said lower partition spaced around said port communicating with said inlet chamber as stops against said inlet valve member upon decreasing pressure of fluid in said inlet chamber and rising movement of said inlet valve member against said lower partition, outlet valve means comprising a flat member located in said outlet chamber and movable into flat contacting sealing relation against said upper partition adjacent to and to seal said port communicating with said outlet and distributing chambers upon decreasing fluid pressure in said distributing chamber, and a second set of downward projections carried by the top wall of said housing and spaced about said outlet opening therein as stops against said outlet valve member upon increasing pressure of fluid in said outlet chamber and rising movement of said member toward said outlet opening.

No references cited.